Jan. 22, 1935.　　　　F. O'NEILL　　　　1,988,699
GLASS GATHERING AND FORMING MACHINE
Original Filed April 3, 1926　　3 Sheets-Sheet 1

Frank O'Neill
Inventor
By
Attorney

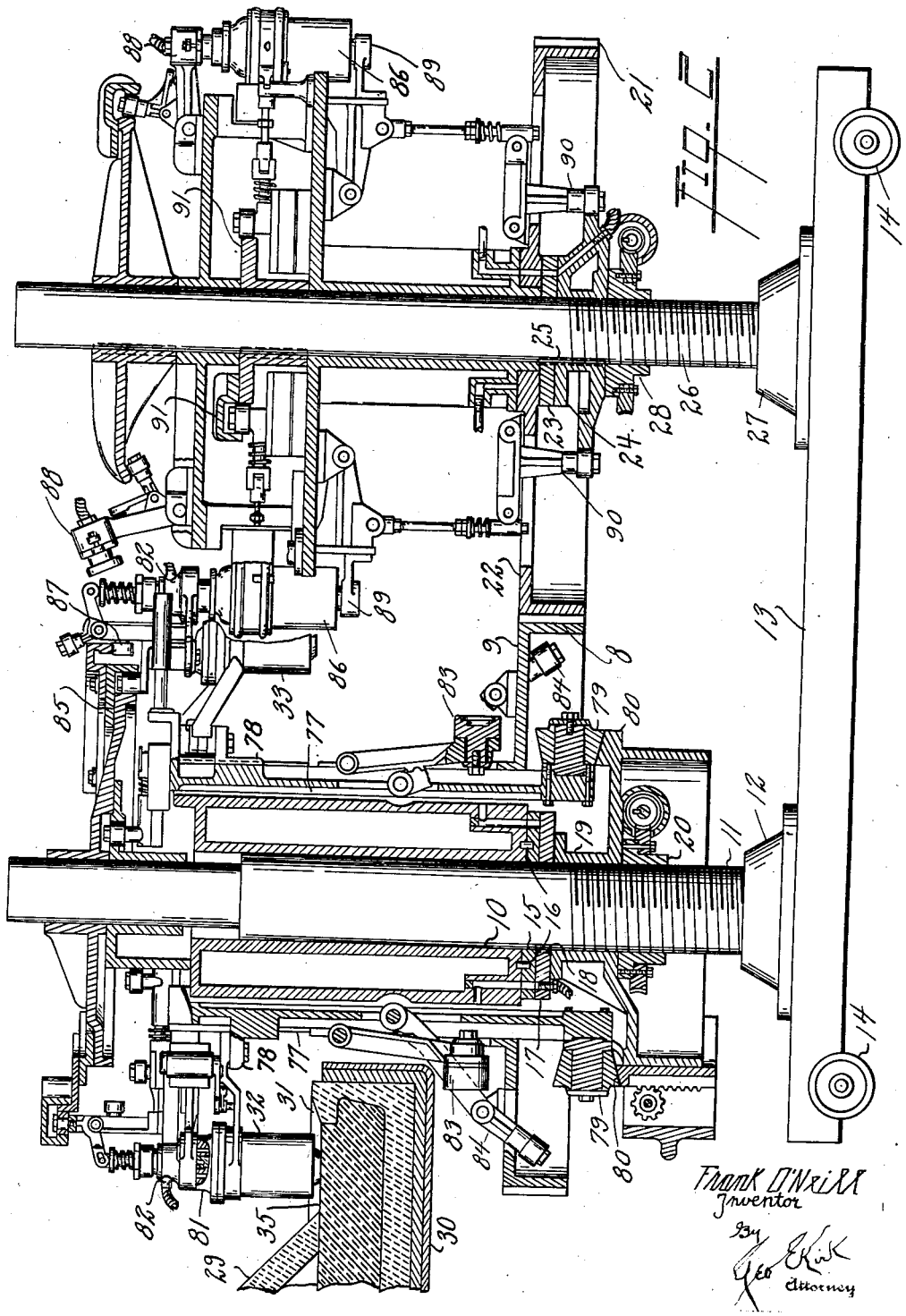

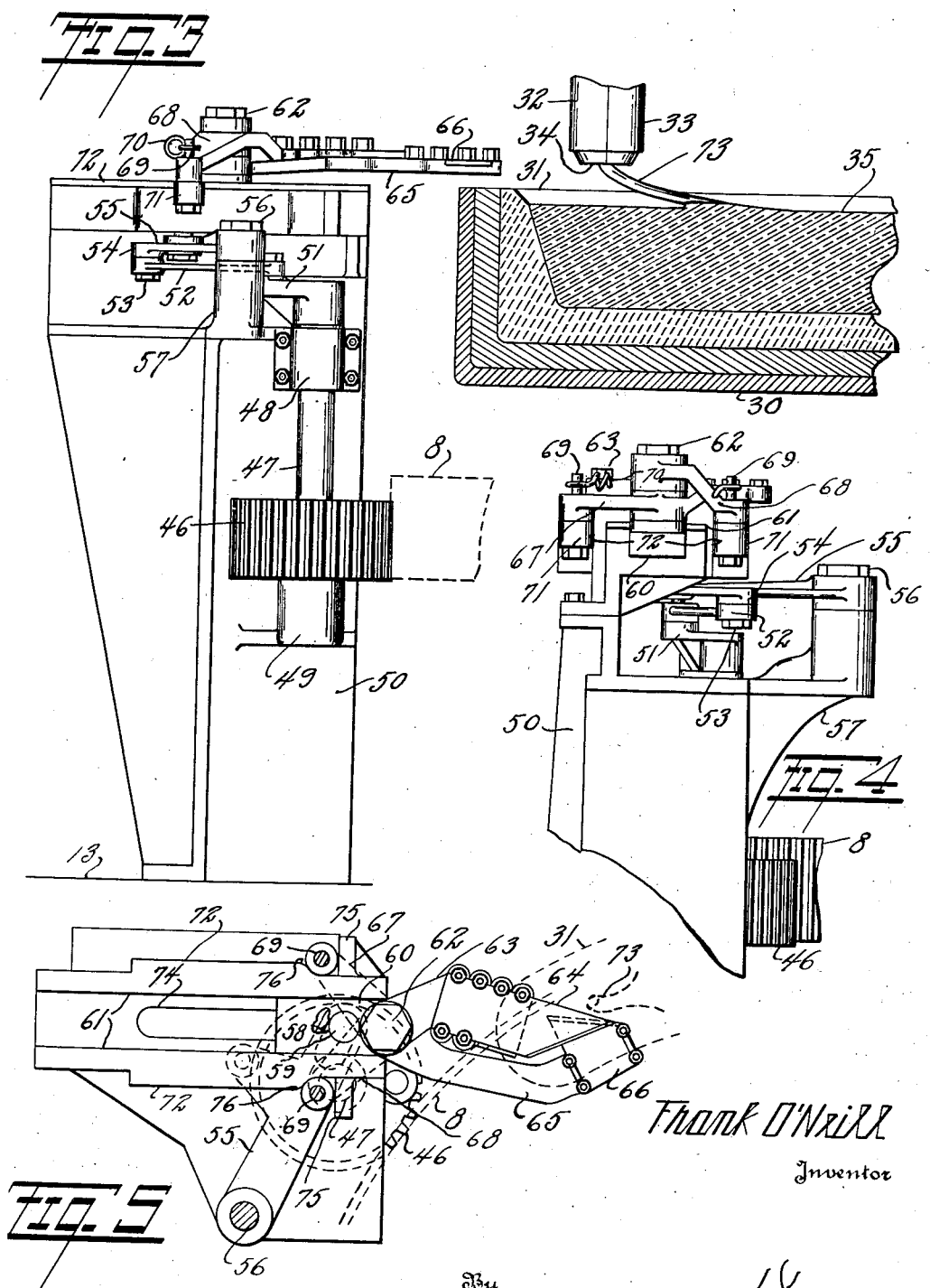

Patented Jan. 22, 1935

1,988,699

UNITED STATES PATENT OFFICE 1,988,699

GLASS GATHERING AND FORMING MACHINE

Frank O'Neill, Toledo, Ohio, assignor, by mesne assignments, to Owens-Illinois Glass Company, Toledo, Ohio, a corporation of Ohio Original application April 3, 1926, Serial No. 99,479. Divided and this application March 6, 1933, Serial No. 659,829

3 Claims. (Cl. 49—5)

This invention relates to gathering molten glass and forming into articles, as hollow ware.

This invention has utility when incorporated in a suction gather press-and-blow apparatus. As herein disclosed, there is a stationary tank exposing upwardly a pool of molten glass. The provision of the machine proper involves two columns: one for the first or gather and preliminary forming referred to as the blank table or column, and the other as the finish or blow table or column, which receives the blank from the first table, completes the blowing operation, and delivers the completed article for annealing. The blank molds are in an annular series involving a lower or main pair of hinge sections open at the bottom. Each blank mold is carried on a crosshead which, besides having the travel about the column in an endless orbit, has vertical movement to bring the open bottom of the blank mold in proximity with the molten glass pool. There is a maintained circulation of the molten glass in the pool to avoid freezing or chilling interference in the gather. This main blank mold has its open bottom closed after the suction gather in drawing the glass up into such mold, and the attenuation cut therefrom to fall back in the tank or pool. More particularly herein, importance resides in the shear shown as the complementary blade type, lever operated in synchronism with the gather receiver or blank mold as carried by the rotary table. It is thus seen that, as to the shear proper, its utility is in cooperation with a receiver or gather which may be a blank mold, and such is independent of whether or not the finish mold be on a separate table.

The upper end of this suction gathered blank has the plunger withdrawn therefrom and the blank distended into the blank mold by pressure flow in completing formation of the blank. This upper portion of the blank is equipped with a neck finish mold section radially reciprocable on the side toward the blow table, there to deliver the formed blank from the opened blank mold sections into a blow mold as closing about such blank, at which time the neck mold finish is opened and then retracted. The delivered blank into the blow mold is then further distended, the blow mold opened, and the blow mold bottom depressed or lowered to tilt the finished ware away from and cut of the opened blow mold in discharging such from the machine.

A material factor in the operation of this machine is the rapidity with which the ware may be produced, and the showing specifically is for continuous operation. As herein embodied, there is maximum time interval consumed at the transfer. To minimize such as governing the total output of the machine, there may be a speeding up of the machine and the operation of the machine drive may be intermittent as shown in applicant's Patent No. 1,551,526 of August 25, 1925. Under these circumstances, the station stop permits the transfer functions to be completed, and the interval may be a minimum only for the recover stroke in the reciprocating drive for the carriers.

Referring to the drawings:

Fig. 2 is a section on the line II—II, Fig. 1;

Fig. 3 is a side elevation of the shear as co-operating with the gather, parts being broken away;

Fig. 4 is a fragmentary view of the shear from the left of Fig. 3; and

Fig. 5 is a plan view of the shear of Fig. 3 as in shearing completing position.

Main drive

Figure 1:
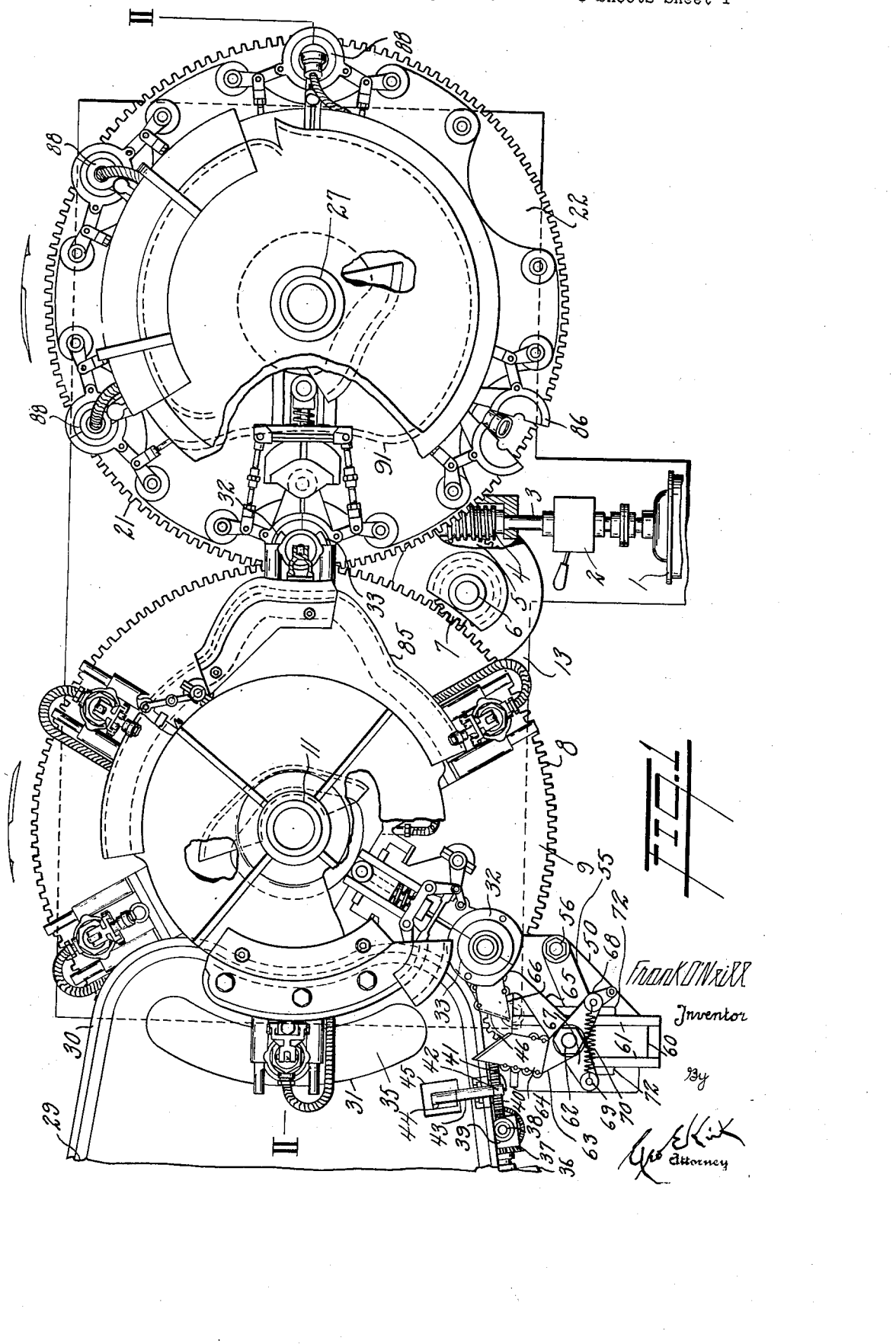
Fig. 1 is a plan view, with parts broken away, of an embodiment of the invention in connection with a gather device press-and-blow two table or carrier glass machine.

Motor 1 is shown as having variable speed transmission box 2 for controlling rotation of drive shaft 3 having worm 4 (Fig. 1) in mesh with worm wheel 5 on shaft 6 having driving gear 7 in mesh with gear 8 as the large main drive gear provided with web or table portion 9 fixed with sleeve 10 (Fig. 2) about column 11 mounted on base 12 carried by platform 13 mounted on rollers 14. This sleeve 10 is mounted on supporting plate 15 and connected thereto by dowels 16 and thus located over plate 17 connected by key 18 to be fixed against rotation as to the column 11 and sustained by ring member 19 held in position by threaded sleeve 20 adjustable on the column 11 (Fig. 2).

This blank carrier or table 9 has its direction of rotation counterclockwise, and its toothed portion 8 is directly in mesh with toothed portion 21 having web 22 (Figs. 1, 2) serving as the blow table carrier. This web 22 is sustained on plate 23, as a bearing, riding upon collar 24 with which it is connected against rotation by key 25, assembling such plate 23 and collar 24 against rotation as to column 26 mounted on base 27. This collar 24 is sustained by threaded member 28 having direct coaction with this second column 26, on which it is adjustable.

Gather

Glass tank 29 has forehearth or overhanging boot 30 (Figs. 1, 2). This forehearth has in its upper portion elongated opening 31 on an arc preferably on the axis of the column 11 of the first table or turret. In the rotation of the blank table 9, blank mold main sections 32, 33, are closed and have open bottom 34 brought into proximity with surface 35 of the pool of molten glass in the boot 30. This closed blank mold 32, 33, with open bottom 34, (Fig. 3), has such open bottom 34 skim along approximately at the surface of the molten glass and then rise therefrom in leaving the region of the forehearth 30.

Molten glass circulator

The contact of this molten glass surface with the traveling mold has a tendency to create a chill region in the forehearth 30, and there is provision herein of a molten glass circulating means to cause a current or flow of the molten glass about the forehearth.

To this end, motor 36 (Fig. 1) has connection through bevel gears 37 for driving shaft 38 having transmission to worm gear 39 actuating worm wheel 40, having pivot pin 41 engaging arm 42 rocking shaft 43 from which depends paddle 44 through opening 45, thereby to protrude into the molten glass adjacent the forehearth, being controllably actuated to promote circulation of glass from the forehearth back into the pool.

The shear

The blank table 9 has its toothed portion 8 in mesh with pinion 46 (Fig. 3) mounted on shaft 47 carried by bearings 48, 49, of bracket 50 mounted on the truck platform 13. This shaft 47 (Fig. 3) as protruding above the bearing 48, carries a crank 51 from which extends link 52 to pin 53 on offset 54 of lever 55 (Figs. 1, 3, 4, 5), mounted on fixed pin 56 carried by extension 57 from the bracket 50. This lever 55 has slot 58 with which engages pin 59 carried by crosshead 60 reciprocable in horizontal guides 61 carried by the bracket 50. This crosshead 60 carries pin 62 upon which is mounted the pair of shear levers. Shear lever 63 carries upper blade 64 of the shear. Companion shear lever 65 carries lower blade 66. These shear levers 63, 65, have extension 67, 68, carrying upstanding pins 69 connected by tension helical spring 70. These pins 69, as extending through the lever arms 67, 68, respectively carry rollers 71 riding along guideways 72 as the crank 51 swings and is effective through link 52 for causing the lever 55 to operate the crosshead 60 toward the forehearth 30 and away therefrom.

In this movement toward the forehearth as approaching the blank mold rising from the forehearth with a gather of glass therein, the shear blades 64, 66, snap together to sever attenuation 73 as depending from the gather of glass in the blank mold in close proximity to such blank mold. This action of the shears further is one of shifting this attenuation laterally of the gather opening region 31 for the lower shear blade 66 in striking this attenuation 73 tends to work such toward the paddle 44, which paddle 44 is a means for accentuating this drawing off of the somewhat chilled glass, and working such back into the tank or furnace region for re-heating.

The actual shear operation occurs as the actuating pin 59 in traveling along slot 74, through the guides 61, approaches stops 75 where the rollers 71 are drawn by the spring 70 into portions 76, thus effecting a quick snapping action in the closing of the shear blades 64, 66, into slightly overlapping position in effecting the glass severing. The continuation of the rotation of the shaft 47 at once retracts the shear blades 64, 66, at a speed to get away from the blank mold and have such ready for a repetition of this cycle of operations even during the continuous operation of the carrier 9, as carrying an endless series of blank molds. The length of this slide for the crosshead 60 is one giving quite a range of travel. The position of the actuating shaft 47, with the link and leverage connection therefrom, is a variable lineal travel drive for the crosshead 60, giving such a quick withdrawal and quick speeding up positions with the shearing action directly, instantaneously, and against, any drawing tendency as to the molten glass thereabove in the gather of the blank mold.

The quick forward and retrieving action allows ample clearance as to the continuation of the travel of the blank mold, as well as a quick approach to the approximate position of action at the snapping off of the attenuation 73.

The blank mold carrier

Blank mold table or carrier 9 about the column 11 and extending axially of said column has an annular series of guides 77, in which are vertical movable crossheads 78 (Fig. 2) controllable by rolls 79 traveling on track 80 and determining the cycle of travel for the gather receptacle or blank mold device 32, 33. The blank mold sections 32, 33, are shown as provided with neck mold sections 81, with which may cooperate head 82 having exhausting connections for the suction gather, and in sequence therefrom a blow connection for blank forming. Bottom closure 83 is controllable by lever 84 during this blank forming. After the blank forming, the blank sections 32, 33, are open to suspend the blank in the neck sections 81. As herein disclosed, the neck sections 81 as carrying the blank, may have their position controlled by cam 85 as to sectional blow mold section 86. At this position, control device 87 is operable to open the neck finish and thus complete delivery of the formed blank into the blow mold where blow head 88 may cooperate in forming the blank into finished ware. This blow mold is shown as having mold bottom portion 89 controllable from lever device 90. In this cycle of operations, cam 91 is effective for controlling this blow mold, not only for closing around the blank, but for opening for delivery of the formed bank from the machine.

The operations of the blades of the shear to move over the forebay and then clear thereof in retracting, thus locates the blades to reduce the extent of exposure to heat from the forebay, notwithstanding this single shear device be used for the entire series of containers effecting the gathers.

This application is a division of my pending application Ser. No. 99,479, filed April 3, 1926, for Glass gathering and forming machines.

What is claimed and it is desired to secure by Letters Patent is:

1. A gather device having an open bottom adapted to receive a suction charge of molten glass from a pool, shear mechanism movable relatively to the device and operable for clearing the device of protruding glass extending from the open bottom end of the device, a rotary table carrier for the device, said table having a gear fixed therewith, said shear mechanism including a pinion in mesh with the gear, a pair of shear blades, a cross-head mounting for the blades, a transmission connection from the pinion to the cross-head to shift the latter to bring the blades into operable proximity to the device bottom, and control means for there operating the blades to sever the glass.

2. A gather device having an open bottom adapted to receive a suction charge of molten glass from a pool, shear mechanism movable relatively to the device and operable for clearing the device of protruding glass extending from the open bottom end of the device; a rotary table carrier for the device, said table having a gear fixed therewith, said shear mechanism including a pinion in mesh with the gear, a pair of shear blades, a cross-head mounting for the blades, a shaft from the pinion, a crank on the shaft, said cross-head having a slot, and a pin on the crank engaging the cross-head slot.

3. A gather device having an open bottom adapted to receive a suction charge of molten glass from a pool, shear mechanism movable relatively to the device and operable for clearing the device of protruding glass extending from the open bottom end of the device, a rotary table carrier for the device, said table having a gear fixed therewith, said shear mechanism including a pinion in mesh with the gear, a pair of shear blades, a lever for each blade, fulcrum bearing means for the levers, a cross-head mounting for the bearing means, a shaft for the pinion, a crank on the shaft, said cross-head having a slot, a pin on the crank engaging the cross-head slot, a guide for the cross-head, cam means along said guide, and lever carried means coacting with the cam means for controlling said blades.

FRANK O'NEILL.